United States Patent Office 3,127,412
Patented Mar. 31, 1964

3,127,412
PROCESS FOR CONDITIONING PIGMENTS
Hans Gaertner, Basel, and Guenther Zwahlen, Arlesheim, Switzerland, assignors to Ciba Limited, Basel, Switzerland, a company of Switzerland
No Drawing. Filed Sept. 26, 1960, Ser. No. 58,193
Claims priority, application Switzerland Sept. 29, 1959
8 Claims. (Cl. 260—314.5)

It is known that the synthesis of most organic pigments leads to the pigment in a coarsely crystalline form in which the pigment is unsuitable for use. This is especially true of phthalocyanines, dioxazine pigments, linear quinacridones and many anthraquinonoid pigments. In order to bring the pigment into a form suitable for use, the crude pigment must be subjected to an after-treatment or so-called conditioning treatment. This conditioning treatment must bring the product into a very fine state of subdivision or dispersion, since the tinctorial strength of the pigment depends largely thereon. In many cases conversion of the pigment into a different crystal modification accompanies the conditioning treatment.

A very large number of methods for conditioning such pigments are known, for example, dissolution or swelling of the pigment in a concentrated acid, such as sulfuric acid or a chloracetic acid, followed by introduction of the mixture into water. In this manner the pigment is precipitated from the aqueous medium in a finely dispersed form. However, when such pigment dispersions are dried an irreversible agglomeration frequently occurs, so that after being dried the pigment is useless. Such agglomeration upon drying can be avoided by the so-called "Flushing" process in which the pigment is transferred to an organic medium with retention of the original state of dispersion of the pigment. However, this process is complicated, and the purposes for which such pigment dispersions can be used are limited.

It is also known to subject crude pigments to intense mechanical treatment in mills or kneading devices in the presence of an organic solvent and/or an inorganic disintegration assistant, especially a salt. However, all these methods have one or more of the following disadvantages.

The desired state of fineness of the pigments can frequently be obtained only by a long period of treatment. The removal of the disintegration assistant often causes difficulties, and it is generally not possible to use the assistant again, unless a considerable expenditure of energy and much apparatus are used to regenerate the assistant. The use of organic liquids also involves difficulty arising from the fire hazard.

The present invention is based on the observation that the above mentioned disadvantages can be overcome by grinding the pigment to be conditioned in an aqueous grinding medium in the presence of an organic compound which is solid and largely water-insoluble under the grinding conditions and is capable of being removed by sublimation, distillation with steam or by means of an organic solvent, and then separating the treated pigment from the grinding medium.

An important advantage of the process of this invention is that substantially only water is used as the liquid grinding medium and it is unnecessary to add to the grinding medium large quantities of organic liquids miscible with water. The pigment to be conditioned is advantageously used in the form of a filter cake moist with water, such as is obtained from a pigment suspension by filtration and, if desired, subsequent washing. The ratio of pigment to the aqueous medium may vary within wide limits, but it is preferably within the range of 1 to 12 parts of water for each part of dry pigment. Provided that suitable apparatus is used for the wet grinding, the optimum grinding action is attained at a ratio of 3 to 8 parts of water for each part of dry pigment.

The grinding operation is carried out in the presence of an organic compound (hereinafter referred as a carrier or substratum) which is solid and largely water-insoluble under the grinding conditions and is capable of being removed by sublimation, by distillation with steam or by means of an organic solvent. The term "largely water-insoluble" means that advantageously not more than 5 parts and preferably not more than 1 part of the carrier is soluble in 100 parts of water at room temperature. Such organic compounds are more especially aliphatic or aromatic hydrocarbons or halogen- or nitro-, oxo-, carbonyl- or carboxyl substitution products of aliphatic or aromatic hydrocarbons. There may be mentioned, for example, para-dichlorobenzene, hexachlorobenzene, diphenyl, naphthalene, phthalic anhydride, $\beta$-hexachlorocyclohexane, hexamethyl-ethane, hexabromethane, chloranil, camphor, or more especially hexachlorethane, which owing to its high vapor pressure can be very easily removed from the grinding mixture by sublimation or distillation with steam. There is advantageously used for each part of dry pigment at least 0.1 part of the carrier. Especially good results are obtained with the use of 0.5 to 1.5 parts of the carrier for each part of dry pigment. The use of more than two parts of carrier, for example, five parts, does not improve the grinding effect and merely complicates the working-up of the product. Instead of a single carrier there may also be used a mixture of two or more of the above mentioned carriers.

The particle size of the carrier is not of critical importance in the disintegration of the pigment, since the carrier may be used in a very fine state of division, but substantially the same result is often obtained with carriers in a relatively coarse state of division up to particle sizes of a few millimeters, especially in the case of relatively soft carriers. If necessary, the carrier may be brought into a desired state of subdivision by known methods, for example, by grinding or reprecipitation.

In addition to the carrier there may be present other additions, for example, water-soluble or water-insoluble organic compounds, for example, alcohols, more especially methanol, ethanol or isopropanol, or phenols such as hydroxybenzene or cresol; ketones such as acetone, methyl ethyl ketone, and cyclohexanone; carboxylic acids, such as acetic acid, benzoic acid, phthalic acid or an ester thereof; sulfonic acids, such as methane sulfonic acid, benzene sulfonic acid or naphthalene sulfonic acids; or bases such as pyridine, or ethanolamine; or ionic or non-ionic surface-active substances or texture-improving agents, such as stearic acid, resin acids, resin acid esters, such as dihydroabietic acid esters, or paraffin oil. The quantities of the additions must be so controlled that the insolubility of the carrier in the grinding medium is substantially unaffected.

In general the grinding temperature is not critical within industrially reasonable limits, but it must be below the melting point of the carrier. Generally the grinding is carried out at about room temperature or a slightly raised temperature, and therefore advantageously within the range of 20° C. to 80° C. In certain cases, for example, in the case of copper phthalocyanine, metal-free phthalocyanine and copper phthalocyanines having a low degree of halogenation that is to say, those containing one or two atoms of bromine or chlorine, it is possible by suitably selecting the grinding temperature to influence the crystal modification of the product obtained, as is further described below.

The process can be carried out in a simple manner. The pigment, carrier, water and additions, if any, are introduced simultaneously or in suitable order of succession into a highly efficient wet grinding apparatus, and ground, while keeping the mixture at a suitable temperature, until the pigment has attained the desired state of fineness. There may be used an apparatus which enables the pigment and the carrier to be subjected in a liquid medium to intense mechanical stresses. Many types of apparatus of this kind are known. They operate, for example by producing in a liquid medium steep velocity gradients or a sudden change of direction, or more especially by the impact or rubbing together of grinding bodies, such as metal balls, porcelain balls (for example of 3 to 10 millimeters' diameter), or sand grains, which are set in motion by the rotation of the vessel or more effectively by vibrators or devices acting like stirrers. Apparatus of that kind is known in commerce under a very wide variety of names, such as homogenizing machines, ball mills, swing hammer mills, attritor mills, sand grinders or colloid mills. Apparatus that is not very effective can be used, provided that the period of grinding is extended and, in some cases, a sufficiently large number of sufficiently small auxiliary grinding bodies are used.

A further advantage of the process of the invention is that wear on the grinding apparatus and, when used, on the auxiliary grinding bodies is less than if the same pigment were ground in an aqueous medium alone or together with a water-soluble dispersing agent in the absence of a solid carrier.

During the grinding operation the pigment, which may initially be in a coarsely crystalline form, is very rapidly disintegrated to a very fine particle size, for example, below 1 micron. Moreover, this degree of disintegration in reached considerably sooner than if the same pigment were ground in the same grinding apparatus in water in the presence of a water-soluble substance having a dispersing action, and in the absence of a solid carrier. In general the particle size of the carrier is not substantially changed by the grinding operation.

The product can be worked up by three basic methods, namely:

(a) The ground material is filtered off and, when necessary, washed to remove water-soluble substances, and the carrier is removed by sublimation. Depending on the melting point and vapor pressure of the carrier it may be of advantage to carry out the sublimation under atmospheric pressure or subatmospheric pressure. It is of advantage to carry out the removal of the water and the carrier in a single operation in the same apparatus. This procedure has the advantage that there is no need to subject the pigment itself to a drying treatment, and the pigment is obtained directly as the result of the removal of the solid carrier in an excellent condition.

(b) The ground material is subjected to distillation with steam. When water-soluble substances are present it may be of advantage to filter off the ground material and wash it, before steam distillation. In this manner there is obtained a pigment suspension free from carrier and, when desired, free from water-soluble additions. It is of advantage to remove as much as possible of the water from the pigment suspension by filtration and to remove the remainder by drying, advantageously under reduced pressure at a temperature not exceeding 100° C. It has been surprisingly found that with most pigments no hardening of the pigment occurs due to irreversible agglomeration of the particles, such as otherwise frequently occurs in drying aqueous moist pigment press cakes, and that a pure pigment having excellent properties is obtained. This result is obtained especially when the carrier or the temperature used for the steam distillation is so chosen that the carrier does not melt during the steam distillation.

(c) The ground material is filtered off, if desired, washed, and the press cake, moist with water, is extracted with a liquid having a good solvent power for the carrier. There is obtained a pigment dispersion free from carrier and any additions, and the residual water can be removed from the dispersion by drying as described in (b). By using a water-soluble solvent for the extraction, for example, acetone, ethanol or isopropanol, the water is removed from the filter cake together with the carrier, and it is finally necessary only to remove the solvent from the pigment. In this procedure there is also obtained a dry pigment of excellent quality.

An important advantage of the process of the invention is that the carrier is recovered, especially when procedure (a) or (b) is used, almost without loss and in a simple manner, and the recovered carrier can be used in further grinding treatments without further purification.

The process of the invention is suitable for conditioning organic pigments of a very wide variety of classes, for example, azo-dyestuffs, anthraquinone dyestuffs, perylene tetracarboxylic acid imide dyestuffs, perinone dyestuffs, indigoid dyestuffs, dioxazine dyestuffs, nitro dyestuffs, quinacridone dyestuffs, phthalocyanine dyestuffs and polyhalogen-phthalocyanine dyestuffs.

Some of these pigments exist in different modifications, and it is an important advantage of the process of this invention that it is possible by suitably selecting the grinding conditions or the carrier to obtain the pigment in the modification desired.

The process is especially advantageous for conditioning copper phthalocyanine, copper phthalocyanine having a low degree of halogenation and metal-free phthalocyanine. These pigments, in contradistinction to the other pigments, are exceptional in that their various modifications, especially the $\alpha$- and $\beta$-forms, and also the conditions for their conversion from one modification to the other have been rather extensively investigated and have been used on the commerce scale. The greenish $\beta$-form and also the reddish $\alpha$-form have been used in the lacquer and plastics industries. The $\alpha$-form is richer in energy and is, therefore, less stable than the $\beta$-modification. Unless it has been stabilized, the $\alpha$-form very rapidly changes with crystal growth into the $\beta$-form in the presence of aromatic solvents.

The process of this invention enables $\alpha$- or $\beta$-copper phthalocyanine or a corresponding low-halogen or metal-free phthalocyanine to be converted into a conditioned phthalocyanine pigment which is in an energy-rich form at least equal to that of the initial pigment.

Thus, for example, in the case of copper phthalocyanine the following conversions are possible:

A. Crude $\beta$-CuPc→conditioned $\alpha$-CuPc
B. Crude $\alpha$-CuPc→conditioned $\alpha$-CuPc
C. Crude $\beta$-CuPc→conditioned $\beta$-CuPc A. The conversion of crude $\beta$-copper phthalocyanine into conditioned $\alpha$-copper phthalocyanine takes place when there is used as carrier an aliphatic substratum, especially hexachlorethane in the ratio of at most three parts to one part of pigment, and a temperature within the range of 5° C. to 30° C. is used. Owing to the fact that the intense mechanical working of the material being ground causes the liberation of considerable heat, care must be taken by cooling the material that the temperature does not rise above room temperature or about 30° C. It is surprising that the $\alpha$-form so obtained, in contradistinction to the $\alpha$-form obtainable by reprecipitation from sulfuric acid, is to a large extent resistant to flocculation. By flocculation is meant the agglomeration of the pigment particles dispersed in a liquid to form larger particles, which cause a considerable reduction in the tinctorial strength of the pigment. The resistance to flocculation can be still further improved, by carrying out the grinding in the presence of a lower aliphatic aldehyde, for example, formaldehyde, acetaldehyde, propionaldehyde, butyraldehyde or glyoxal, or a compound yielding an aldehyde under the conditions of operation, for example, paraformaldehyde, metaldehyde or paraldehyde, or nitrogenous derivatives of aldehyde, such as hexamethylene tetramine. The same result is obtained by the addition of water-soluble amides, especially amides of carbonic acid or of lower aliphatic carboxylic acids, for example, urea, formamide, dimethylformamide or acetamide. There are advantageously used 1 to 5 mols of aldehyde or amide for each mol of copper phthalocyanine. Instead of adding the aforesaid substances before or during the grinding operation, the pigment may be subjected to the action of such a substance after the grinding operation, for example, by stirring a pigment suspension obtained by grinding with an aqueous solution of the aldehyde or amide before or advantageously after removing the carrier. An α-copper phthalocyanine pigment obtained by the conversion A undergoes the usual conversion to the β-form in the presence of solvents having a crystallizing action, but there is surprisingly no appreciable crystal growth. In the latter respect such a pigment differs from an α-form obtained by reprecipitation from sulfuric acid.

B. The conversion of crude (that is to say, obtained by reprecipitation from sulfuric acid) α-copper phthalocyanine, low-halogenated α-copper phthalocyanine or metal-free α-phthalocyanine into conditioned α-copper phthalocyanine is carried out under the same conditions as those for β-copper phthalocyanine. As, in this case, there is no change in the modification of the pigment, the grinding period can be considerably shortened. This conversion is especially suitable for the production of α-copper phthalocyanines that are resistant to crystallization, when the starting material is a mixture obtained by reprecipitation from sulfuric acid, of α-copper phthalocyanine with a stabilizing heavy metal phthalocyanine, or a mixture of α-copper phthalocyanine obtained by reprecipitation from sulfuric acid with one or more heavy metal phthalocyanines having a stabilizing action that have not been reprecipitated from sulfuric acid.

C. In order to condition crude β-copper phthalocyanine, a low-halogen β-copper phthalocyanine or metal-free β-phthalocyanine without changing the modification, the following conditions are required:

(1) The use of an aromatic hydrocarbon or halogenated aromatic hydrocarbon as carrier, for example, naphthalene, at any temperature, or (2) The use of at least three parts, and preferably at least five parts, of hexachlorethane for each part of pigment, at any temperature, or (3) The use of hexachlorethane at a temperature above 40° C., for example, 60° C. depending on the construction and size of the grinding apparatus. In order to maintain the aforesaid temperatures either the heat liberated during the grinding operation suffices or further heat must be supplied externally, or (4) The use of hexachlorethane and one of the above mentioned additions, for example, naphthalene or phenols at any temperature.

The following examples illustrate the invention, the parts and percentages being by weight.

*Example 1*

112 parts of water, 14 parts of finely powdered para-dichlorobenzene and 14 parts of crude β-copper phthalocyanine are introduced into a laboratory-type attritor mill and ground for 24 hours at room temperature, after which time the crystal needles of the pigment, which originally were up to about 100μ long, have completely disappeared. The pigment has been absorbed in a very fine division (particle size below 1μ) by the para-dichlorobenzene which itself is only little disintegrated. The mill is emptied, rinsed with water, and the resulting suspension is filtered. The filter cake is washed with water (filtrate and wash water are colorless) and heated overnight at 55° C. under reduced pressure, whereby at first predominantly the water and then the para-dichlorobenzene are removed almost completely. The dry product is easy to squash so as to form a soft powder which consists substantially completely of pure pigment; its weight is almost identical with that of the crude pigment used as starting material. With the pigment powder so prepared a wide variety of plastics, lacquers and printing pastes can be colored in the usual manner shades of outstanding color strength and pure tints, while the coarsely crystalline crude pigment is entirely unsuitable for such purposes. The X-ray diffraction diagram of the resulting pigment reveals that it has the same crystal lattice as the crude starting pigment (being the so-called β-modification).

*Example 2*

A laboratory-type attritor mill is charged with 112 parts of water, 14 parts of crude β-copper phthalocyanine, 13.3 parts of finely powdered hexachloroethane and 0.7 part of finely powdered naphthalene. After grinding for 24 hours at room temperature, the needles of the starting pigment, which were about 100μ long at the start, have completely disappeared. The mill is emptied, rinsed with water, and the resulting suspension is worked up by sublimation at 120° as described in Example 1. A pigment powder of the β-form is obtained which possesses the same excellent properties as the product obtained according to Example 1.

*Example 3*

When the process described in Example 2 is carried out with the use of 14 parts of crude β-copper phthalocyanine, 14 parts of hexachloroethane, 5 parts of phenol and 108 parts of water, a pure β-form of equally good quality is obtained.

Instead of phenol, cresol may be used with equal success.

*Example 4*

A laboratory-type attritor mill is charged with 21 parts of crude β-copper phthalocyanine, 21 parts of hexachloroethane and 98 parts of water. After grinding for 24 hours at 45° the needles of the starting pigment, which were originally about 100μ long, have disappeared completely. The mill is emptied, rinsed with water, and the ground material is freed from hexachloroethane by steam distillation. The remaining aqueous pigment suspension is filtered and the filter cake is washed and dried in a vacuum cabinet at 80° C. The pigment obtained in this manner is in the pure β-form.

*Example 5*

When the process described in Example 4 is performed at room temperature with the use of 5 parts of crude β-copper phthalocyanine, 25 parts of hexachloroethane and 100 parts of water, a pure β-form of equally good quality is obtained.

*Example 6*

14 parts of crude β-copper phthalocyanine, 14 parts of hexachloroethane and 112 parts of water are ground for 72 hours in an attritor mill at 15 to 20° C. The resulting pigment is the pure α-form and is of outstanding fineness.

By using crude β-monochloro-copper phthalocyanine instead of β-copper phthalocyanine, a finely dispersed α-form is likewise obtained.

When using instead of crude β-copper phthalocyanine an α-form obtained by reprecipitation from sulfuric acid, a finely divided α-form is obtained even when the product is ground for only 24 hours.

*Example 7*

A laboratory-type attritor mill is charged with 14 parts of crude β-copper phthalocyanine, 14 parts of hexachloroethane, 1 part of paraformaldehyde and 112 parts of water. After having been ground for 72 hours at 20° C., the crude starting product has been completely converted to the α-form in an extremely fine state of division. The mill is emptied, rinsed with water and the ground material is freed from hexachloroethane by steam distillation. The remaining aqueous pigment dispersion is filtered, and the filter cake is washed and dried in a vacuum cabinet at 80° C. The resulting pigment is a pure α-modification and has no tendency to flocculate when incorporated in lacquers, acetate rayon spinning compositions or the like.

*Example 8*

When the process described in Example 7 is performed with the use of 14 parts of crude β-copper phthalocyanine, 14 parts of hexachloroethane, 2 parts of aqueous formaldehyde solution of 37% strength and 110 parts of water, and the mixture is ground for 72 hours at 20° C., a very finely divided pigment of the pure α-form is obtained which likewise does not flocculate.

*Example 9*

When the process described in Example 4 is performed with the use of 14 parts of crude β-copper phthalocyanine, 14 parts of hexachloroethane, 2.2 parts of paracetaldehyde and 110 parts of water, and the mixture is ground for 72 hours at 15° C., a fine pigment of the pure α-form is obtained which likewise does not flocculate.

*Example 10*

A laboratory-type attritor mill is charged with 64 parts of water, 14 parts of finely powdered hexachloroethane, 1.1 parts of formamide and 61 parts of a press cake still moist with water which contains 14 parts of crude β-copper phthalocyanine.

After grinding for 72 hours at 18° the crystal needles of the crude pigment, which originally were 100 to 200μ long, have disappeared completely and the hexachloroethane has absorbed the starting pigment in a very fine state of division. At the same time, the β-modification of the starting pigment has been completely transformed into the α-modification, as revealed by the X-ray diffraction diagram. The mill is then emptied, rinsed with water, and the resulting suspension is filtered. The filter cake is washed with water and then heated to 120° C. in a vacuum cabinet, whereby at first predominantly the water and then the hexachloroethane are removed substantially completely.

The dry product forms a loose cake and is easy to squash to form a soft powder. The resulting pigment is suitable for coloring plastics, lacquers, spinning compositions and the like, in which α-copper phthalocyanine is not reconverted to the β-modificaton by contact with an aromatic solvent. The product has excellent stability to flocculation.

*Example 11*

(1) A laboratory-type attritor mill is charged with 102 parts of water, 18.9 parts of finely powdered hexachloroethane, 0.81 part of urotropin and 18.9 parts of crude β-copper phthalocyanine. After grinding for 72 hours, the original β-modification of the pigment has been converted to the α-modification in a very finely divided form. The mill is emptied, rinsed with water, and the resulting suspension is freed from hexachloroethane by steam distillation. The remaining aqueous dyestuff suspension is filtered, and the filter cake is washed with water and then dried in a vacuum cabinet at 60° C. The copper pathalocyanine pigment of the α-modification prepared in this manner is very stable to flocculation.

(2) A pigment of equally soft grain and stability to flocculation is obtained when, instead of grinding the crude pigment with an aldehyde or amide, the previously conditioned pigment is after-treated with one of these agents. For this purpose 30 parts of a water-moist filter cake containing 15 parts of α-copper phthalocyanine—prepared by grinding crude β-copper phthalocyanine with water in the presence of hexachloroethane (see Example 6)—are stirred with 5 parts of urotropin in 65 parts of water for 30 minutes at 60° C. The suspension is filtered and the filter cake washed with water and dried in a vacuum cabinet at 60° C. The dry product forms a soft pigment powder which is very stable to flocculation.

(3) A pigment of similar properties is obtained by stirring 30 parts of a watermoist filter cake containing 15 parts of α-copper phthalocyanine—prepared by grinding crude β-copper phthalocyanine with hexachloroethane and water (see Example 6)—with 10 parts of propionaldehyde in 60 parts of water for 30 minutes at 40° C. and then working up the product as described in the second paragraph. The resulting pigment powder is very stable to flocculation and easy to disperse.

(4) A pigment powder of equally good stability to flocculation and dispersibility is obtained by using 5 parts of butyraldehyde instead of 10 parts of propionaldehyde, and 100 instead of 60 parts of water and stirring the suspension at 60° C.

(5) A pigment powder of equally good stability to flocculation is obtained by stirring 10 parts of a water-moist filter cake containing 5 parts of α-copper phthalocyanine—prepared by grinding crude β-copper phthalocyanine with hexachloroethane and water (see Example 6)—with 5 parts of dimethylformamide and 40 parts of water for 30 minutes at 60° C. The suspension is filtered, and the filter cake is washed with water and dried in a vacuum cabinet at 60° C.

(6) When 5 parts of acetamide are used instead of 5 parts of dimethyl formamide, proceeding otherwise as described under (5) above, a pigment of very good stability to flocculation is obtained.

(7) The process described under (5) above is performed with 5 parts of urea instead of with 5 parts of dimethyl formamide.

*Example 12*

(1) A laboratory-type attritor mill is charged with 105 parts of water, 21 parts of a water-moist filter cake containing 14 parts of hexachloroethane (obtained by subjecting previously ground hexachloroethane to steam distillation) and 14 parts of β-monochloro-copper phthalocyanine.

After grinding for 48 hours at 11° C. the coarse crystals of the starting pigment have disappeared completely and the product has been taken up in a very fine state of division by the hexachloroethane. At the same time the β-modification of the starting pigment has been rearranged to the α-modification, as is revealed by the X-ray diffraction diagram. The mill is then emptied, rinsed with water, and the resulting suspension is freed from hexachloroethane by steam distillation. The remaining aqueous pigment suspension is filtered, and the filter cake is washed with water and dried in a vacuum cabinet at 80° C. The resulting dry pigment forms a loose cake which is easy to squash to form a soft powder.

(2) The process described under (1) above is performed but with the use of 14 parts of tetra-4-nitro-copper phthalocyanine instead of with 14 parts of β-monochloro-copper phthalocyanine. Grinding for 72 hours yields a soft powder.

(3) The process described under (1) above is performed with 14 parts of vanadyl phthalocyanine instead of with 14 parts of β-monochloro-copper phthalocyanine. Grinding for 72 hours at 12° C. yields a soft-grained powder.

(4) The process described under (1) above is performed with 14 parts of polychloro-copper phthalocyanine containing 15 to 16 atoms of chlorine per molecule instead of with 14 parts of β-monochloro-copper phthalocyanine. The batch is ground for 24 hours.

(5) The process described under (4) above is performed with 14 parts of naphthalene in place of 14 parts of hexachloroethane. After grinding for 24 hours, the naphthalene is removed by sublimation.

Example 13

14 parts of β-phthalocyanine,
14 parts of hexachloroethane and
112 parts of water are ground for 24 hours at 45° C., and the batch is worked up as described in Example 12. The resulting product is in the β-modification.

14 parts of β-phthalocyanine,
14 parts of finely powdered hexachloroethane, and
112 parts of water are ground for 72 hours at 15 to 20° C. in an attritor mill, and the batch is then worked up as described in Example 12. As revealed by its X-ray diffraction diagram, the pigment thus prepared is in the α-modification.

Example 14

A laboratory-type attritor mill is charged with 100 parts of water, 14 parts of finely powdered hexachloroethane and 26 parts of a filter cake, still moist with water, containing 14 parts of crude flavanthrone. After 24 hours' grinding the coarse crystalline lumps of flavanthrone have disappeared completely. The pigment has been taken up by the hexachloroethane in a very fine state of division, which itself is not much disintegrated. The mill is emptied, rinsed with water and the resulting suspension is freed from hexachloroethane by steam distillation. The remaining aqueous pigment suspension is filtered, and the filter cake is washed and dried in a vacuum cabinet at 80° C. The dry product is ground and if desired strained through a sieve of 0.075 mm. mesh (DIN 80). With the resulting pigment powder a wide variety of plastics, printing pastes and more especially lacquers can be colored in the usual manner to produce very strong, pure shades, while the coarsely crystalline crude pigment is completely unsuitable for such purposes.

When instead of 14 parts of hexachloroethane there are used 14 parts of finely powdered diphenyl purified by sublimation, proceeding otherwise as described in the first paragraph above, a useful pigment toner is likewise obtained. When diphenyl is used as vehicle, it is advantageously removed by sublimation (in a vacuum cabinet, at 65° C.) at a temperature below the melting point.

Example 15

A laboratory-type attritor mill is charged with 68 parts of water, 14 parts of finely powdered naphthalene (purified by sublimation or steam distillation) and 58 parts of a water-moist press cake containing 14 parts of the crude, red disazo pigment of the formula

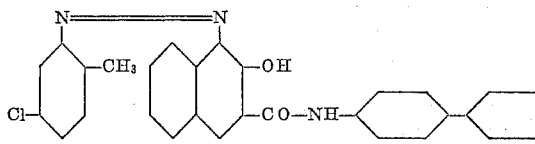

The polymorphous pigment is present in the A-modification. After 24 hours' grinding at room temperature, the coarse crystals of the crude pigment have disappeared completely and have been taken up by the naphthalene. At the same time complete conversion of the A-modification to the coloristically more valuable E-modification takes place, as can be shown by the X-ray diffraction diagram. The mill is emptied, rinsed, and the ground suspension consisting of water, pigment and naphthalene, is filtered and washed. By sublimation and simultaneous drying at 75° C. in a vacuum cabinet the naphthalene is removed substantially completely from the dyestuff. The dry product is easy to squash so as to form a soft powder which consists practically entirely of pure pigment, and its weight is substantially identical with that of the crude starting pigment. With the resulting pigment powder a wide variety of plastics, lacquers and printing pastes can be colored extremely strong, pure shades, while the crude pigment produces considerably weaker dyeings and distinctly duller tints.

By using in the method described in the first paragraph 14 parts of hexachloroethane instead of 14 parts of naphthalene and grinding at 20° C., the hexachloroethane then being removed by steam distillation as described in Example 14, an excellent pigment toner is likewise formed.

As revealed by the X-ray diffraction diagram the grinding with hexachloroethane at room temperature likewise causes a change in modification, but in this case the final product is in the B-modification and is of a distinctly different shade from that of the E-modification obtained by grinding with napthalene as described in the first paragraph above.

When the process described in the second paragraph is performed, except that grinding is carried out at 45° C., a finely divided pigment is obtained in the same modification as the starting pigment, namely the A-modification.

Thus, depending on the vehicle and grinding temperature chosen, a variety of modifications can be prepared as described.

Example 16

A laboratory-type attritor mill is charged with 106 parts of water, 20 parts of a water-moist press cake containing 14 parts of hexachloroethane (prepared by subjecting hexachloroethane to steam distillation followed by filtration) and 14 parts of a crude, coarsely crystalline dioxazine pigment of the following formula

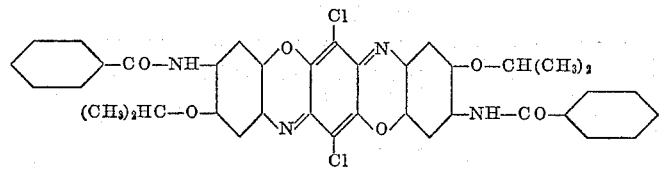

After grinding for 36 hours at room temperature the crystal needles of the crude pigment, originally about 50μ long, have disappeared completely and have been taken up by the hexachloroethane, which itself is not much disintegrated. The mill is emptied, rinsed with water, and the resulting suspension is substantially completely freed from hexachloroethane by steam distillation. The remaining dyestuff suspension is filtered, washed, and the moist filter cake is dried in a vacuum cabinet at 80° C. The dry product forms a soft, loose powder and its weight is practically identical with that of the crude pigment used as starting material. The resulting pigment powder produces in a wide variety of plastics, printing pastes, lacquers and like materials colorations of outstanding strength and purity, while the coarsely crystalline crude pigment is quite unsuitable for such purposes.

*Example 17*

A laboratory-type attritor mill is charged with 89 parts of water, 14 parts of finely powdered hexachloroethane, and 37 parts of a water-moist press cake containing 14 parts of a dioxazine pigment of the formula

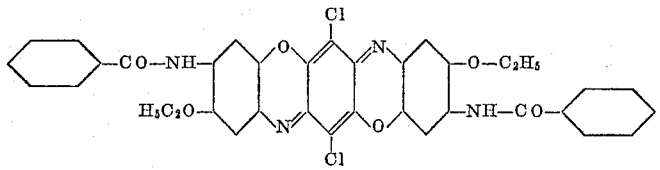

After grinding for 24 hours at room temperature or, for example, at 45° C., the crystal needles, which were originally 30 to 50μ long, have disappeared completely and the pigment has been taken up by the hexachloroethane in a very fine state of distribution (particle size: below 1μ). The mill is emptied, rinsed with water, and the resulting suspension is filtered. The filter cake is washed with water and heated under reduced pressure at 120° C., whereby at first predominantly the water and then the hexachloroethane are removed almost completely. The dry product is easy to squash to form a soft powder consisting substantially of pure pigment.

The pigment can be used for coloring as mentioned in Examples 14 to 16. As revealed by its X-ray diffraction diagram the resulting pigment has the same crystal lattice as the crude starting pigment.

When 14 parts of naphthalene are used instead of 14 parts of hexachloroethane, proceeding otherwise as described in the first paragraph above except that the naphthalene is removed at 75° C., a pigment toner of equal quality and properties is obtained as described in paragraph 1 above. As revealed by the X-ray diffraction diagram the resulting pigment has the same crystal lattice as the crude starting pigment and the pigment prepared according to the first paragraph above.

*Example 18*

A laboratory-type attritor mill is charged with 112 parts of water, 14 parts of finely powdered naphthalene and 14 parts of the crude, red anthraquinone dye of the formula

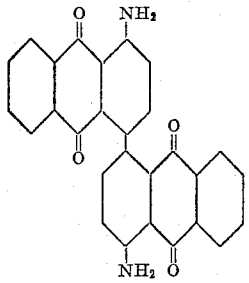

After grinding for 24 hours at room temperature, the coarse crystals of the starting pigment have disappeared completely and the dyestuff has been absorbed by the naphthalene. The mill is emptied, rinsed with water, the resulting suspension is filtered, washed with water, and the remaining filter cake is heated under vacuum to 75° C., whereby at first predominantly the water and then the naphthalene are removed substantially completely. The dry product is easy to squash to form a soft powder. By the known methods the resulting pigment powder can be used to produce in a wide variety of plastics, lacquers and printing pastes outstandingly strong and pure colorations, while the crude pigment produces much weaker and distinctly duller shades.

When 14 parts of hexachloroethane are used instead of 14 parts of naphthalene, proceeding otherwise as described in Example 16, the resulting pigment likewise has very good properties as far as its application and tinctorial aspects are concerned.

As revealed by their X-ray diffraction diagrams, the pigments obtained as described above in paragraphs 1 and and 2 have the same crystal lattice as the starting pigment.

*Example 19*

A laboratory-type attritor mill is charged with 92 parts of water, 18 parts of hexachloroethane and 30 parts of a water-moist filter cake containing 9 parts of indanthrone in the α-modification. After grinding for 36 hours at room temperature the coarse crystal needles of indanthrone, which originally were 40 to 80μ long, have disappeared completely and have been absorbed in a very fine state of division by the hexachloroethane. The mill is emptied, rinsed with water, and the resulting suspension is freed from hexachloroethane by steam distillation. The remaining aqueous dyestuff suspension is filtered, and the filter cake is washed and dried in a vacuum cabinet at 60° C. The dry product is ground and strained. As revealed by its X-ray diffraction diagram, the resulting pigment powder is still in the α-modification; it is primarily suitable for coloring lacquers.

When the grinding is carried out at 45° C. under otherwise indentical conditions—that is to say within a temperature range in which hexachloroethane is present in the triclinal form—pigment is obtained which is likewise in the α-modification and has the same properties as the product obtained according to the first paragraph above.

By using 18 parts of para-dichlorobenzene instead of hexachloroethane, grinding as described in paragraph 1 above, and separating the para-dichlorobenzene from the dyestuff by sublimation, a good pigment powder is likewise obtained.

*Example 20*

(1) A laboratory-type attritor mill is charged with 93 parts of water, 14 parts of finely powdered diphenyl and 33 parts of a water-moist press cake containing 14 parts of the crude pigment of the formula

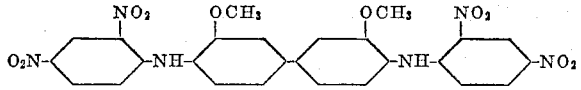

After grinding for 24 hours at room temperature the crude pigment has been absorbed in a very fine state of division by the diphenyl. The mill is emptied, rinsed with water, and the resulting suspension is filtered. From the washed filter cake the diphenyl is removed by sublimation at 65° C. with simultaneous drying.

The dry product is easy to squash to form a soft powder which consists substantially of pure pigment and weighs almost as much as the crude starting pigment did.

(2) By using 14 parts of finely powdered hexachloroethane instead of 14 parts of diphenyl, grinding as described in the first paragraph above, removing the hexachloroethane by steam distillation as described in Example 16, and drying, there is likewise obtained a soft, loose pigment powder which is very easy to squash.

(3) The pigments prepared as described in paragraphs 1 and 2, above, applied in known manner to a wide variety of plastics and lacquers, produce extremely strong, pure brown shades, while the unconditioned crude pigment is unsuitable for such purposes. As revealed by their X-ray diffraction diagrams, the pigments conditioned with diphenyl and hexachloroethane respectively have the same crystal lattice as the crude pigment.

*Example 21*

A laboratory-type attritor mill is charged with 112 parts of water, 14 parts of finely powdered hexachloroethane and 14 parts of dichlorinated isoviolanthrone.

After grinding for 24 hours at room temperature, the very coarse crystalline lumps of the crude pigment have disappeared and the dyestuff has been absorbed by the hexachloroethane in a very fine state of division. The mill is emptied, rinsed with water, and the hexachloroethane is removed by steam distillation. The remaining dyestuff suspension is filtered, washed and dried. The dry product forms a very soft powder which, when applied to a wide variety of plastics, printing pastes and lacquers, produces outstandingly strong, pure shades, while the crude pigment is useless for such applications.

The crystal modification of the resulting conditioned pigment is identical with that of the crude pigment, as revealed by its X-ray diffraction diagram.

*Example 22*

A laboratory-type attritor mill is charged with 112 parts of water, 14 parts of naphthalene and 14 parts of linear quinacridone of the α-modification. After grinding for 24 hours at room temperature, when the course crystals of the crude pigment (originally 60µ) have been absorbed in a very fine state of division by the naphthalene, the mill is emptied, rinsed with water and the resulting suspension is filtered. The naphthalene is removed from the washed filter cake by sublimation at 75° C., accompanied by drying. The ground dry product colors by known methods a wide variety of plastics, lacquers and like materials, very strong, pure shades. As revealed by its X-ray diffraction diagram the conditioned pigment has the same crystal lattice as the starting pigment.

By using 14 parts of hexachloroethane instead of 14 parts of naphthalene, grinding as described in the first paragraph above, removing the hexachloroethane by steam distillation according to Example 16, or by sublimation according to Example 17, a pigment is obtained which produces, for example in lacquers, even stronger and purer shades than the pigment obtained as described in the first paragraph above. This pigment is likewise in the α-modification, as is revealed by its X-ray diffraction diagram.

By using in the process described in the second paragraph above 14 parts of β-quinacridone instead of 14 parts of α-quinacridone, grinding as described in the first paragraph, removing the hexachloroethane by sublimation at 90 to 100° C., an excellent violet pigment of great tinctorial strength and pure shade is obtained. As revealed by its X-ray diffraction diagram the resulting pigment is in the β-modification, as was the starting pigment. An identical result is obtained by grinding at 45° C.

*Example 23*

A laboratory-type attritor mill is charged with 112 parts of water, 14 parts of finely powdered para-dichlorobenzene and 14 parts of a red disazo dyestuff of the formula

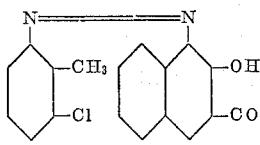 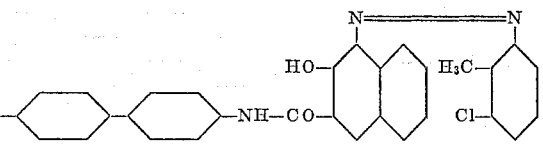

After grinding for 24 hours at room temperature, the mill is emptied, rinsed with water, and the suspension formed is filtered and washed with water. From the filter cake the para-dichlorobenzene is removed substantially completely by sublimation at 55° C., accompanied by drying. The dry product forms a very soft, loose powder which produces in a wide variety of plastics, lacquers and the like, colorations of outstanding strength and pure shade, such as could never be attained with the crude pigment.

An equally good pigment toner is obtained by using 14 parts of hexachloroethane instead of 14 parts of para-dichlorobenzene and removing it as described in the second paragraph of Example 22.

*Example 24*

When the dyestuff used in Example 23 is replaced by the red disazo dyestuff of the formula

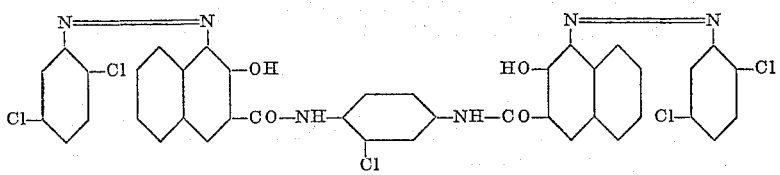

an equally good conditioned pigment toner is obtained as in Example 23.

*Example 25*

14 parts of indigo
14 parts of finely powdered naphthalene and
112 parts of water are ground for 24 hours at room temperature in an attritor mill. The suspension is poured out and the naphthalene is removed from it by sublimation as described in the first paragraph of Example 15. A soft pigment powder of considerable tinctorial strength is obtained.

*Example 26*

112 parts of water
14 parts of finely powdered hexachloroethane and
14 parts of a red dyestuff of the formula

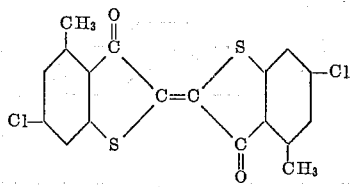

are ground for 24 hours at room temperature in an attritor mill. The suspension is poured out and the hexachloroethane is removed from it by sublimation as described in Example 17, but at a temperature of only 90 to 100° C. A soft pigment powder of considerable tinctorial strength is obtained.

Example 27

A laboratory-type attritor mill is charged with 112 parts of water, 14 parts of finely powdered hexachloroethane and 14 parts of a red dyestuff of the formula

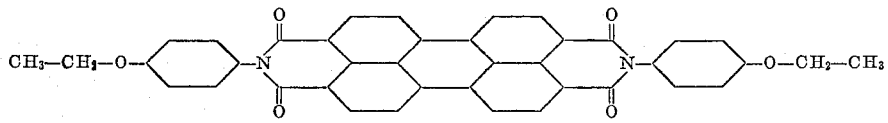

After grinding for 24 hours at room temperature the crystal needles of the starting pigment, which originally were 200 to 400μ long and 10 to 20μ wide, have disappeared completely. The pigment has been absorbed in a very fine state of division by the hexachloroethane. The mill is emptied, rinsed with water, and the suspension is filtered. The filter cake is washed with water and then heated in a vacuum cabinet at 90–100° C., whereby at first predominantly the water and then the hexachloroethane are substantially completely removed.

The dry product forms a porous cake which is very easy to squash to form a soft powder.

During the grinding the orange red A-modification is converted to the coloristically more valuable scarlet and more brillant B-modification, as is revealed by the X-ray diffraction diagram.

Example 28

A laboratory-type attritor mill is charged with 10 parts of water, 15 parts of finely powdered hexachloroethane and 125 parts of a water-moist filter cake containing 10 parts of the red dyestuff of the formula

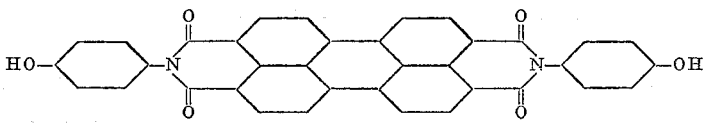

After grinding for 48 hours at room temperature, the mill is emptied and rinsed with water. The resulting suspension is centrifuged for 1 hour at 2000 revolutions per minute. The supernatant liquid is decanted and from the precipitate thus formed the hexachloroethane is removed with simultaneous drying in a vacuum cabinet by sublimation at 90° C. The dry pigment thus obtained forms a loose, soft powder. During the grinding no change in modification occurs.

Example 29

A laboratory-type attritor mill is charged with 112 parts of water, 14 parts of finely powdered hexachloroethane and 14 parts of the orange dyestuff of the formula

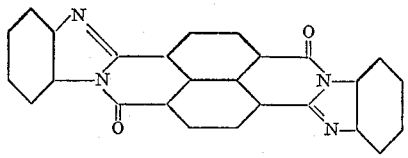

After grinding for 24 hours at 18° C., the mill is emptied, rinsed with water, and from the resulting suspension the hexachloroethane is removed by steam distillation. The

16 dyestuff suspension which is now free from hexachloroethane, is filtered, washed with water, and the filter cake is dried in a vacuum cabinet at 60° C. The dry product is ground and strained, whereupon it forms a loose, soft powder.

Example 30

A laboratory-type attritor mill is charged with 112 parts of water, 14 parts of finely powdered hexachloroethane and 14 parts of the red dyestuff of the formula

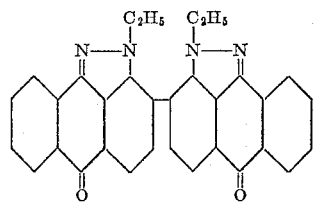

After grinding for 24 hours at 20° C., the mill is emptied and rinsed with water, and the resulting suspension is filtered. The filter cake is washed with water and the hexachloroethane is then removed in a vacuum cabinet with simultaneous drying by sublimation at 90° C. The dry product forms a soft powder.

What is claimed is:

1. A process for conditioning organic pigment selected from the group consisting of azo pigment, dioxazine pigment, quinacridone pigment, anthraquinone pigment, indigoid pigment, perinone pigment, perylene-tetracarboxylic acid imide pigment, nitro-dyestuff pigment and phthalocyanine pigment, wherein the pigment to be conditioned is ground in grinding medium consisting essentially of water in the presence as carrier of an organic compound which is solid and largely water-insoluble under the grinding conditions and is capable of being removed by an operation selected from the group consisting of sublimation, distillation with steam and extraction with an organic solvent, said compound being selected from the group consisting of para-dichlorobenzene, hexachlorobenzene, diphenyl, naphthalene, phthalic anhydride, β-hexachlorocyclohexane, hexamethyl-ethane, hexabromethane, chloranil, camphor and hexachlorethane, and the treated pigment is separated from the grinding medium.

2. A process as claimed in claim 1, wherein the carrier is hexachlorethane.

3. A process as claimed in claim 1, wherein the proportion of the carrier is within the range of 0.5 to 1.5 parts for each part of dry pigment.

4. A process as claimed in claim 1, wherein the ground aqueous mixture is subjected to steam distillation to remove the carrier and the water is removed from the resulting aqueous pigment dispersion.

5. A process as claimed in claim 1, wherein the pigment to be conditioned is copper phthalocyanine.

6. A process for the manufacture of conditioned copper phthalocyanine pigment from crude form of the pigment, wherein the crude pigment is ground in grinding medium consisting essentially of water in the presence in the grinding medium of hexachlorethane as pigment carrier, and upon completion of the grinding separating the latter from the conditioned pigment.

7. A process for the manufacture of conditioned low-halogen copper phthalocyanine pigment from crude form of the pigment, wherein the crude pigment is ground in grinding medium consisting essentially of water in the presence in the grinding medium of hexachlorethane as pigment carrier, and upon completion of the grinding separating the latter from the conditioned pigment.

8. A process for the manufacture of conditioned metal-free phthalocyanine pigment from crude form of the pigment, wherein the crude pigment is ground in grinding medium consisting essentially of water in the presence in the grinding medium of hexachlorethane as pigment carrier, and upon completion of the grinding separating the latter from the conditioned pigment.

References Cited in the file of this patent
UNITED STATES PATENTS

| | | |
|---|---|---|
| 2,556,726 | Lane | June 12, 1951 |
| 2,791,589 | Pugin | May 7, 1957 |
| 2,857,400 | Cooper | Oct. 21, 1958 |

UNITED STATES PATENT OFFICE
CERTIFICATE OF CORRECTION

Patent No. 3,127,412                                March 31, 1964

Hans Gaertner et al.

It is hereby certified that error appears in the above numbered patent requiring correction and that the said Letters Patent should read as corrected below.

Column 7, lines 64 and 65, for "pathalocyanine" read -- phthalocyanine --; columns 9 and 10, Example 15, the right-hand portion of the formula should appear as shown below instead of as in the patent:

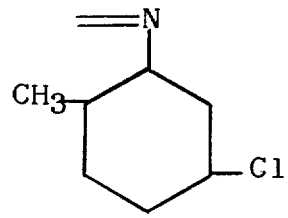

column 13, line 50, for "course" read -- coarse --.

Signed and sealed this 24th day of November 1964.

(SEAL)
Attest:

ERNEST W. SWIDER                          EDWARD J. BRENNER
Attesting Officer                       Commissioner of Patents